Figure 1:
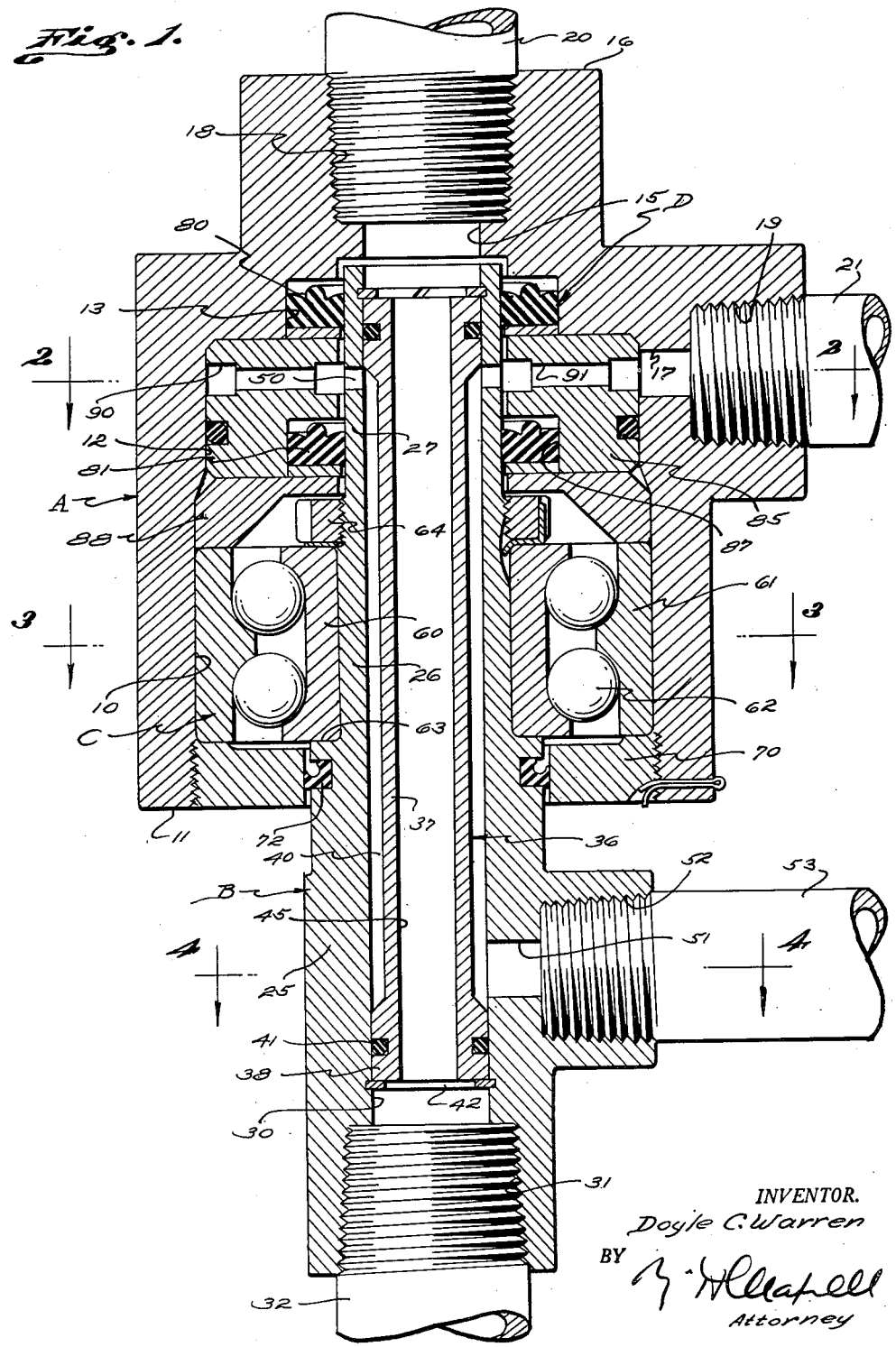

Feb. 1, 1955  D. C. WARREN  2,701,146
MULTIPLE PASSAGE FLUID HANDLING SWIVEL CONNECTION
Filed April 24, 1950  2 Sheets-Sheet 1

INVENTOR.
Doyle C. Warren
BY
Attorney

Feb. 1, 1955 D. C. WARREN 2,701,146
MULTIPLE PASSAGE FLUID HANDLING SWIVEL CONNECTION
Filed April 24, 1950 2 Sheets-Sheet 2

INVENTOR.
Doyle C. Warren
BY
Attorney

United States Patent Office 2,701,146
Patented Feb. 1, 1955

2,701,146

MULTIPLE PASSAGE FLUID HANDLING SWIVEL CONNECTION

Doyle C. Warren, Fullerton, Calif., assignor to Chiksan Company, Brea, Calif., a corporation of California Application April 24, 1950, Serial No. 157,761

11 Claims. (Cl. 285—22)

This invention is concerned with a fluid handling swivel connection and it is a general object of the invention to provide a joint or connection having sections connected for relative rotation and handling fluid in a plurality of separate streams.

A general object of the present invention is to provide a swivel joint or connection handling fluid in separate channels or so that the fluid is in separate streams, thus making it practical for handling streams flowing in opposite directions, or under different conditions, such as at different velocities or pressures, and even for handling different fluids simultaneously.

A further object of the present invention is to provide a joint construction of the general character referred to handling a plurality of streams of fluid without danger of contamination one from the other and without materially restricting or impairing flow of either of the streams.

It is another object of the invention to provide a joint construction of the general character referred to involving few simple dependable parts handling two different or separate streams of fluid so that such streams may be operated through the structure simultaneously and wholly independent of each other when the stream is at rest or the section thereof are in motion or being rotated relative to each other.

Another object of the invention is to provide a joint construction of the general character referred to involving few simple parts, that are inexpensive of manufacture and such that they can be conveniently assembled and removed for purpose of repair or replacement, as circumstances may require.

It is a further object of the invention to provide a structure of the general character referred to in which the sealing means employed involves two spaced annular seals or rings which may, in practice, be like or identical and which are so located as to maintain the streams of fluid separated from each other and spaced from or out of contact with the bearing means provided for supporting the sections of the structure for relative rotation.

The construction embodying the present invention involves, generally, two relatively rotating sections, one a body or socket section and the other a male or spindle section. The body section has a bearing socket entering it from one end and inward of the socket there is a first or large counterbore, and inward of the first counterbore there is a second or small counterbore. In a typical case an axial port or fluid handling opening enters the body from one end concentric with the socket and counterbore and a side or lateral port enters one side of the body intermediate its ends. The spindle has an outer end portion projecting outward from or beyond the outer end of the body and within the body it has a bearing portion and an inner end portion inward of the bearing portion. The spindle is characterized by two fluid handling passageways and in a typical form it has a central passageway that extends from one end of the spindle to the other and it has an annular passageway surrounding the central passageway and extending from the head inner portion to the outer end portion to connect lateral ports in said portions.

Bearing means supports the spindle in the body and is preferably an anti-friction bearing with an outer race in the socket and an inner race on the bearing portion of the spindle, there being supporting balls between the races. The inner race is retained on the bearing portion by a retainer threaded on the spindle and the outer race is retained in the socket by a retainer threaded into the body.

A sealing means is provided to act between the sections of the structure and preferably involves two like axially spaced sealing rings carried in the body and sealing around the spindle so that the port in the inner portion of the spindle occurs between the rings. In a typical construction one sealing ring is carried in the second or small counterbore of the body while the other is carried in the carrier inserted in the large or first counterbore. The carrier is ported and provides a fluid connection between the port in the inner portion of the spindle and the port in the side of the body between the ends thereof.

Figure 2:
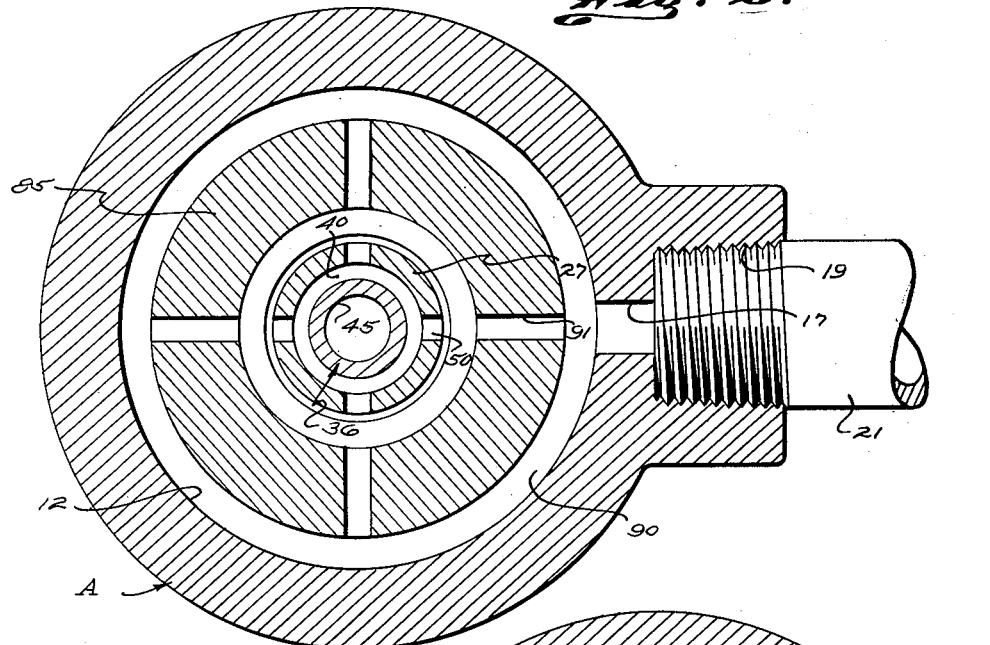
Figure 3:
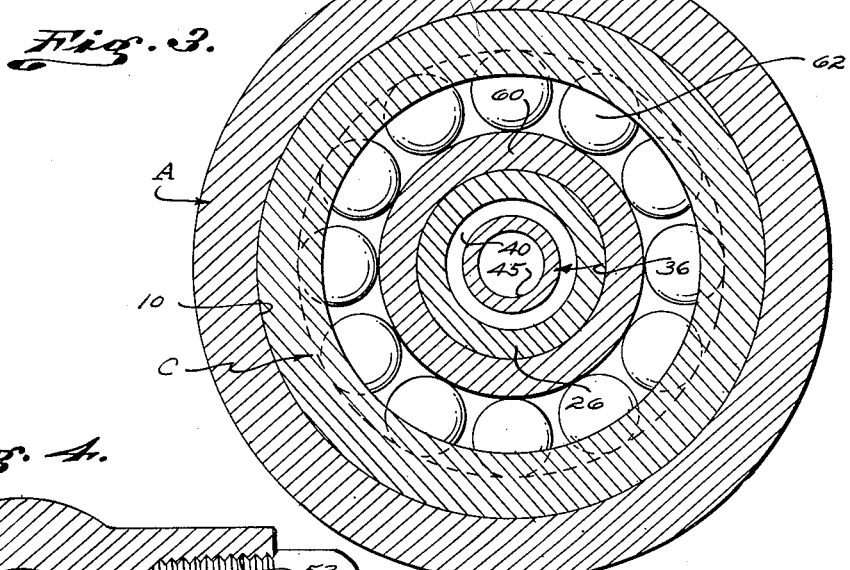
Figure 4:
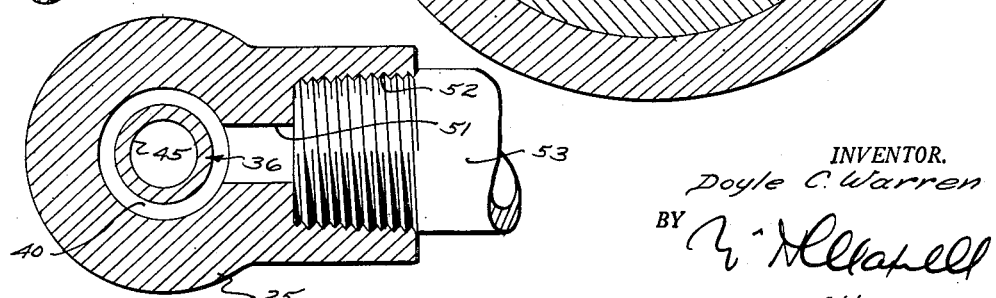

The various objects and features of my invention will be fully understood from the following detailed description of a typical preferred form and application of the invention, throughout which description reference is made to the accompanying drawings, in which:

Fig. 1 is a longitudinal detailed sectional view of a typical form of structure embodying the present invention. Fig. 2 is a detailed transverse sectional view of the structure, being a view taken as indicated by line 2—2 on Fig. 1. Fig. 3 is a transverse sectional view taken as indicated by line 3—3 on Fig. 1, and Fig. 4 is a detailed transverse sectional view taken as indicated by line 4—4 on Fig. 1.

The present invention contemplates a swivel joint or connection handling a plurality of separate or different streams of fluid, either different streams of one kind of fluid or different streams of different kinds of fluid. In the typical case illustrated in the drawings the invention provides two main sections, a body or socket section A and a male or spindle section B, bearing means C rotatably coupling the sections A and B and sealing means D acting between the sections A and B to properly control or confine the streams of fluid handled by the sections by reason of the unique construction of the sections hereinafter described in detail.

The body section A is shown as having a bearing socket 10 entering it from its outer end 11 to carry the bearing means C. A first or large counterbore 12 occurs in the body A inward of the socket 10 and a second or small counterbore 13 occurs further in the body or inward of the first counterbore and is considerably smaller in diameter than the first counterbore. In accordance with the present invention the body is provided with a plurality of ports or fluid passages and in the particular case illustrated it has a central fluid passage 15 entering from its inner end 16 and opening into or at the bottom of counterbore 13. A second port or passage 17 is provided in one side of the body A intermediate the ends of the body, and in the case illustrated it is so located as to be opposite or in communication with the first or large counterbore 12. In the particular form of the invention illustrated the fluid passages 15 and 17 have threaded portions 18 and 19, respectively, to hold pipes or ducts as circumstances may require. A central or axial pipe 20 is shown threaded into opening 18 and a lateral pipe 21 is threaded into opening 19.

The male or spindle section of the structure is an elongate tubular member with an outer end portion 25 that projects outward from or beyond the end 11 of the body section A and within the body section the spindle has a bearing carrying portion 26 and an inner end portion 27. A central opening or fluid carrying passage 30 extends through the spindle from one end to the other and at the projecting or outer end portion 25 the opening has a threaded part 31 suitable for the reception of a pipe 32 or the like.

In accordance with the present invention the spindle B is so formed or constructed as to handle or carry two separate streams of fluid, it being preferred that the spindle be such as to conduct such streams separately between the inner end portion of the spindle and the outer end portion thereof. In the particular form of the invention illustrated the desired streams of fluid are handled or carried in two concentric passageways formed or established by providing a core 36 in the spindle, which core has an elongate tubular center portion 37 and enlarged ends 38. The middle portion 37 of the core is of such length as to extend from the inner end portion 27 of the spindle to the outer end portion 25 thereof and it is somewhat smaller in diameter than the passageway 30 through the spindle, so that there is an annular space or passage 40 formed between the middle portion 37 and the wall of the passage 30 and extending from the inner portion 27 to the outer portion 25. The enlarged ends 27 of the core slidably fit into the passage 30 of the spindle and are sealed therein by suitable packing or sealing rings 41. In the particular case illustrated suitable retainers or snap rings 42 are provided at the ends of the core to retain the core in the desired position longitudinally in the spindle.

The core 36 has a central longitudinal opening or passageway 45 extending through it from one end to the other and serves to handle a stream of fluid between the passageway 15 at the outer end of the body and the passageway 30 at the outer end of the spindle. In accordance with the present invention one or more lateral ports 50 are provided in the inner end portion 27 of the spindle, preferably at a point within the large counterbore 12, to provide connection between the lateral port or passage 17 of the body and the annular passageway 40 in the spindle. In the particular arrangement illustrated in the drawings the lateral ports 50 are opposite or in line with the passageway 17, as will be apparent from Figs. 1 and 2 of the drawings. At the outer end portion 25 of the spindle there is a lateral port or passageway 51 which extends from the outer passageway 40 to the exterior of the spindle. In the particular case illustrated the outer end portion of the passageway 51 is enlarged and threaded at 52 to carry a suitable duct or pipe 53. From the foregoing description it will be apparent that the annular passageway 40 provided in the spindle serves to conduct fluid between the passageways 17 and 51 or between the pipes 21 and 53, independently of the passage of fluid through the core 36 and between the pipes 20 and 32.

The bearing means C rotatably supports spindle in the body and in the form of the invention shown it involves an anti-friction bearing having an inner race 60 carried on the bearing portion 26 of the spindle, an outer race 61 carried in the socket opening 10 and rows of balls 62 operating between the races. The inner race 60 is held against a shoulder 63 on the spindle by a retainer 64 threaded on the inner portion 27 of the spindle adjacent the bearing portion 26. The outer race 21 is retained in the socket 10 by an annular retainer 70 threaded into the outer end portion of the socket opening 10. A suitable sealing ring 72 is provided between the retainer 70 and the exterior of the spindle where the spindle passes through the retainer.

The sealing means D is provided to establish and maintain a suitable seal or seals between the members A and B so that fluids handled by the structure are properly confined and maintained apart. In the preferred form of the invention the sealing means D involves two sealing rings 80 and 81 mounted in the body A and engaging the inner end portion 27 of the spindle at points located at opposite directions from the ports 50 provided in the spindle portion 27. In the particular case illustrated the seating rings 80 and 81 are alike or are both of the same size, shape and type, the ring 80 being carried in the small counterbore 13 in the body and the ring 81 being mounted in the carrier 85 located in the large counterbore 12 of the body. The carrier 85 is an annular member slidably engaged in the large counterbore 12 to occupy the counterbore and to surround the spindle portion 27 where the parts 50 are located. The carrier 85 retains the sealing ring 80 in the small counterbore 25 and it is provided with a central annular socket or bore 87 which carries the sealing ring 81. A spacer 88 occurs between the outer ring or race 61 of the bearing C and the carrier 85 and serves to retain the bearing ring 81 in place, and also to retain the carrier 85 in the counterbore 12. In accordance with the invention the carrier 85 is provided with a series of grooves 90 and ports 91 which serve to provide free and ample fluid carrying ducts or openings between the ports 50 and the passageway 17, as clearly shown in Fig. 2 of the drawings.

From the foregoing description it will be apparent that the construction as provided by the present invention couples the members A and B for free relative movement or rotation and is such that two separate and distinct streams of fluid can be simultaneously passed through or handled by the rotor, one through or between the pipes 20 and 32 and the other through or between the pipes 21 and 53. As an example of a use to which the structure can be put, an outgoing stream of fluid may be passed through the core or between the ducts 20 and 32 while a return stream can be passed around the core 36 or between the ducts 53 and 21. Since the passageways provided in the structure for handling the two streams above referred to are completely separate, one from the other, the streams can be different in character, either as to fluid pressure or other characteristics, or they may be like fluids merely operating or flowing in different directions or possibly in the same direction, but at different pressures or velocities, etc.

Having described only a typical preferred form and application of my invention I do not wish to be limited or restricted to the specific details herein set forth, but wish to reserve to myself any variations or modifications that may appear to those skilled in the art and fall within the scope of the following claims.

Having described my invention, I claim:

1. A fluid handling swivel joint of the character described including, an elongate body with a fluid passage entering it from one end and a socket in it from the other end and a lateral fluid passage intermediate its ends, an antifriction bearing carried in the socket, a single elongate spindle rotatably supported in the bearing and projecting from the body, the spindle having a central elongate passage in communication with the first mentioned passage of the body and open at the projecting portion of the spindle, and the spindle having a second outer passage extending longitudinally therein and open to the lateral passage of the body through a lateral port in the spindle, sealing means including spaced sealing rings carried by the body and engaging the spindle so the port is located between the rings, and an annular fluid handling carrier in the body and surrounding the spindle to overlie said lateral port therein, a socket entering the carrier from one end and supporting one of the rings to occur at one side of the lateral port in the spindle, the carrier being separable from the body, the carrier having inner and outer annular fluid handling grooves and radial ports between the grooves to pass fluid between the port in the spindle and the lateral passage in the body.

2. A fluid handling swivel joint of the character described including, an elongate body with a fluid passage entering it from one end and a socket extending into it from the other end and a lateral fluid passage intermediate its ends, an antifriction bearing carried in the socket, a single elongate spindle rotatably supported in the bearing and projecting from the body, the spindle having an elongate central passage in communication with the first mentioned passage of the body and open at the projecting portion of the spindle, and the spindle having a second outer annular passage extending longitudinally therein and open to the lateral passage of the body through a lateral port in the spindle, sealing means including longitudinally spaced inner and outer sealing rings in the socket and engaging the spindle, the port in the spindle being located between the rings, and an annular fluid handling carrier supported in the socket to surround the spindle and carrying the outer sealing rings, the carrier being separable from the body, the carrier having inner and outer fluid handling grooves and ports to pass fluid between the grooves and between the port in the spindle and the lateral passage in the body, the other ring being supported directly in the socket in the body and confined therein by the carrier.

3. A joint of the character described including, an elongate body having a central fluid passage entering it from one end, a socket entering it from the other end, a first counterbore inward of the socket, a second counterbore inward of the first counterbore and a lateral fluid passage in communication with the first counterbore, a bearing in the socket, a single spindle rotatably carried by the bearing with an inner portion in the counterbores, and an outer portion projecting from the body, the spindle having a central passage communicating with the central passage of the body and an annular passage surrounding the central passage and opening through a lateral port at the first counterbore to communicate with the lateral passage of the body, an annular carrier in the first socket and surrounding the spindle, the carrier having a socket entering it from one end and having inner and outer annular fluid handling grooves and radial ports between the grooves, a spacer in the socket between the bearing and the carrier and closing the socket in the carrier, and two sealing rings engaging the spindle at the exterior thereof and located at the opposite sides of the port in the spindle and lateral passage in the body, one ring being in the socket in the carrier and engaged by the spacer.

4. A joint of the character described including, an elongate body having a central fluid passage entering it from one end, a socket entering it from the other end, a first counterbore of less diameter than the socket and inward of the socket, a second counterbore of less diameter than the first counterbore and inward of the first counterbore and a lateral fluid passage in communication with the first counterbore, a bearing in the socket, a single spindle rotatably carried by the bearing with an inner portion in the counterbores, and an outer portion projecting from the body, the spindle having a central passage communicating with the central passage of the body and an annular passage surrounding the central passage and opening through a lateral port at the first counterbore to communicate with the lateral passage of the body, an annular carrier in the first socket and surrounding the spindle, the carrier having a socket entering it from one end and having inner and outer annular fluid handling grooves and radial ports between the grooves, a spacer in the socket between the bearing and the carrier and closing the socket in the carrier, and two sealing rings engaging the spindle at the exterior thereof and located at the opposite sides of the port in the spindle and lateral passage in the body, one ring being in the first counterbore and engaged by the carrier and the other in the socket in the carrier and engaged by the spacer.

5. A fluid handling swivel joint of the character described including, an elongate body with a fluid passage entering it from one end and a socket in it from the other end and a lateral fluid passage intermediate its ends, an antifriction bearing carried in the socket, a single elongate spindle rotatably supported in the bearing and projecting from the body, the spindle having an elongate central passage in communication with the first mentioned passage of the body and open at the projecting portion of the spindle, and the spindle having a second annular passage surrounding the central passage and extending longitudinally of the spindle and open to the lateral passage of the body through a lateral port in the spindle, sealing means including like longitudinally spaced inner and outer spindle engaging sealing rings carried by the body and engaging the spindle so the lateral port in the spindle is located between the rings, an annular fluid handling carrier slidably supported in the socket to surround the spindle and having a socket entering it from one end and supporting the outer spindle engaging ring and being separable from the body, and a seal carried by the carrier to seal between the outer periphery of the carrier and the socket, the carrier having inner and outer annular fluid handling grooves and radial ports between the grooves to pass fluid between the port in the spindle and the lateral passage in the body.

6. A fluid handling swivel joint of the character described including, an elongate body with a fluid passage entering it from one end and a socket extending into it from the other end and a lateral fluid passage intermediate its ends, an antifriction bearing carried in the socket, a single elongate spindle rotatably supported in the bearing and projecting from the body, the spindle having an elongate central passage in communication with the first mentioned passage of the body and open at the projecting portion of the spindle, and the spindle having a second annular passage surrounding the central passage and extending longitudinally in the spindle and open to the lateral passage of the body through a lateral port in the spindle, sealing means including spaced sealing rings in the socket and engaging the spindle, the port in the spindle being located between the rings, an annular fluid handling carrier supported in the socket and carrying one of the rings, and a seal at the periphery of the carrier having sealing engagement with the socket, the carrier being separable from the body, the carrier having inner and outer fluid handling grooves and ports to pass fluid between the grooves and between the port in the spindle and the lateral passage in the body, the other ring being supported directly in the socket in the body and confined therein by the carrier.

7. A joint of the character described including, an elongate body having a central fluid passage entering it from one end, a socket entering it from the other end, a first counterbore inward of the socket, a second counterbore inward of the first counterbore and a lateral fluid passage in communication with the first counterbore, a bearing in the socket, a single spindle rotatably carried by the bearing with an inner portion in the counterbores, and an outer portion projecting from the body, the spindle having a central passage communicating with the central passage of the body and an annular passage surrounding the central passage and opening through a lateral port in the spindle at the first counterbore to communicate with the lateral passage of the body, an annular carrier in the first socket and surrounding the spindle, a seal at the periphery of the carrier having sealing engagement with the socket, the carrier having a socket entering it from one end and having inner and outer annular fluid handling grooves and radial ports between the grooves, a spacer in the socket between the bearing and the carrier and closing the socket in the carrier, and two sealing rings engaging the spindle at the exterior thereof and located at the opposite sides of the port in the spindle and lateral passage in the body, one ring being in the socket in the carrier and engaged by the spacer.

8. A joint of the character described including, an elongate body having a central fluid passage entering it from one end, a socket entering it from the other end, a first counterbore of less diameter than the socket and inward of the socket, a second counterbore of less diameter than the first counterbore and inward of the first counterbore and a lateral fluid passage in communication with the first counterbore, a bearing in the socket, a single spindle rotatably carried by the bearing with an inner portion in the counterbores, and an outer portion projecting from the body, the spindle having a central passage communicating with the central passage of the body and an annular passage surrounding the central passage and opening through a lateral port in the spindle at the first counterbore to communicate with the lateral passage of the body, an annular carrier in the first socket and surrounding the spindle, a seal at the periphery of the carrier having sealing engagement with the socket, the carrier having a socket entering it from one end and having inner and outer annular fluid handling grooves and radial ports between the grooves, a spacer in the socket between the bearing and the carrier and closing the socket in the carrier, and two sealing rings engaging the spindle at the exterior thereof and located at the opposite sides of the port in the spindle and lateral passage in the body, one ring being in the first counterbore and engaged by the carrier and the other in the socket in the carrier and engaged by the spacer.

9. In a ball bearing swivel joint of the character described including, an elongate body having a central fluid passage entering it from one end, a socket entering it from the other end, a first counterbore of less diameter than the socket and inward of the socket, a second counterbore of less diameter than the first counterbore and inward of the first counterbore and terminating at a flat bottom and a lateral fluid passage in communication with the first counterbore, and antifriction bearing in the socket, a single elongate spindle having a middle portion in the socket and rotatably carried by the bearing, an inner portion of reduced diameter in the counterbores to terminate adjacent the bottom of the second counterbore and an enlarged outer portion projecting from the body, the spindle having a central opening through it from one end to the other and open to the central passage in the body and having annular grooves in the side wall of the opening at the ends of the spindle, an elongate tubular core stationary in the opening in the spindle between the grooves and establishing an annular passage in the spindle around the core, the core having an elongate tubular middle portion spaced from the wall opening in the spindle and having enlarged ends with annular grooves closely fitting and sealing with the wall of the opening in the spindle at the ends thereof, retainer rings in the grooves in the spindle and engaging the ends of the core, sealing rings in the grooves in the ends of the core and sealing between the core and the spindle, there being an inner lateral port in the inner portion of the spindle adjacent the first counterbore and in communication with the annular passage defined by the core and an outer lateral port in the outer portion of the spindle and in communication with the annular passage defined by the core, a fluid handling carrier in the counterbore and separable from the body and surrounding the inner portion of the spindle, two sealing rings engaging the inner portion of the spindle at the exterior thereof and located at opposite sides of the inner lateral port in the spindle, one ring in the first counterbore and the other ring in the carrier in the second counterbore, said antifriction bearings including, an inner race on the middle portion of the spindle, an outer race engaged in the socket, longitudinally spaced annular rows of balls between the races, and a retainer ring threaded in the socket and engaging the outer race of the bearing.

10. In a ball bearing swivel joint of the character described including, an elongated body having a central fluid passage entering it from one end, a socket entering it from the other end, a first counterbore of less diameter than the socket and inward of the socket and terminating at a flat bottom, a second counterbore of less diameter than the first counterbore and inward of the first counterbore and terminating at a flat bottom and a lateral fluid passage in communication with the first counterbore, an antifriction bearing in the socket, a single elongate spindle having a middle portion in the socket and rotatably carried by the bearing an inner portion of reduced diameter in the counterbores to terminate adjacent the bottom of the second counterbore and an enlarged outer portion projecting from the body, the spindle having a central opening through it from one end to the other and open to the central passage in the body and having annular grooves in the side wall of the opening adjacent the ends of the spindle an elongated tubular core stationary in the opening in the spindle between the grooves and establishing an annular passage in the spindle between the ends thereof and around the core, the core having an elongate tubular middle portion spaced from the wall of the opening in the spindle and having enlarged ends with annular grooves closely fitting and sealing with the wall of the opening in the spindle at the ends thereof, retainer rings in the grooves in the spindle and engaging the ends of the core, sealing rings in the grooves in the core and sealing between the core and the spindle, there being an inner lateral port in the inner portion of the spindle adjacent the first counterbore and in communication with the annular passage defined by the central portion of the core in the spindle and an outer lateral port in the outer portion of the spindle and in communication with the annular passage defined by the central portion of the core in the spindle, a ported carrier in the first counterbore abutting the bottom thereof and separable from the body and surrounding the inner portion of spindle to deliver fluid from the inner lateral port in the spindle to the lateral flow passage in the body, a spacer ring in the socket with a reduced extension surrounding the spindle and engaging the carrier in the first counterbore to maintain the carrier in engagement therein, two sealing rings engaging the inner portion of the spindle at the exterior thereof and located at opposite sides of the inner lateral port in the spindle, one ring in the second counterbore and the other ring in the ported carrier in the second counterbore, said antifriction bearings including, an inner race on the middle portion of the spindle to abut the inner end of the outer portion of the spindle, a retainer on the inner portion of the spindle and engaging the inner race, an outer race engaged in the socket to abut the spacer ring, longitudinally spaced annular rows of balls between the races, and a retainer ring threaded in the socket and engaging the outer race.

11. In a ball bearing swivel joint of the character described including, an elongate body having a central fluid passage entering it from one end, a socket entering it from the other end, a first counterbore of less diameter than the socket and inward of the socket, a second counterbore of less diameter than the first counterbore and inward of the first counterbore and a lateral fluid passage in communication with the first counterbore, an antifriction bearing in the socket, a single elongate spindle having a middle portion in the socket and rotatably carried by the bearings an inner portion of reduced diameter at one end of the middle portion in the counterbores to terminate adjacent the bottom of the second counterbore and having a lateral fluid passage adjacent the first counterbore and an enlarged portion projecting from the body, the spindle having a central opening through it from one end to the other and open to the central passage in the body and having an elongate tubular core with a central passageway extending from one end to the other thereof and stationary in the opening in the spindle and establishing a second annular passage in the spindle around the core, the core having an elongate tubular middle portion spaced from the wall of the opening in the spindle and having enlarged ends with annular grooves closely fitting with the wall of the opening in the spindle at the ends thereof, sealing rings in the grooves in said enlarged ends and sealing between the spindle and the core, there being an inner lateral port in the inner portion of the spindle adjacent the first counterbore and in communication with the annular passage and an outer lateral port in the outer portion of the spindle and in communication with the annular passage, an annular fluid handling carrier in the counterbore and separable from the body and surrounding the inner portion of the spindle and having a socket entering it from one end and having an inner annular fluid handling groove in communication with the inner lateral port in the spindle, an outer fluid handling annular groove in communication with the lateral flow passage in the body and radial fluid handling ports between the inner and outer grooves, a spacer ring in the socket surrounding the spindle and engaging the carrier to close the socket therein, two sealing rings engaging the inner portion of the spindle at the exterior thereof and located at opposite sides of the inner lateral port in the spindle, one ring in the second counterbore and the other ring in the socket in the carrier, said antifriction bearings including, an inner race fixed on the middle portion of the spindle, an outer race engaged in the socket to abut the spacer ring, longitudinally spaced annular rows of balls between the races, and a retainer ring threaded in the socket and engaging the outer race of the bearing.

References Cited in the file of this patent

UNITED STATES PATENTS

| | | |
|---|---|---|
| 464,707 | Burns | Dec. 8, 1891 |
| 1,178,999 | Fleming | Apr. 11, 1916 |
| 1,478,370 | Adolphsen | Dec. 25, 1923 |
| 1,788,500 | Uhri | Jan. 13, 1931 |
| 1,880,853 | Davis | Oct. 4, 1932 |
| 1,961,481 | Downs | June 5, 1934 |
| 2,231,149 | Baum | Feb. 11, 1941 |
| 2,412,287 | Phillips | Dec. 10, 1946 |
| 2,424,969 | Carpenter | Aug. 5, 1947 |
| 2,450,895 | Keim | Oct. 12, 1948 |

FOREIGN PATENTS

| | | |
|---|---|---|
| 590,589 | France | June 19, 1925 |